(12) United States Patent
Cheon

(10) Patent No.: US 11,396,936 B2
(45) Date of Patent: Jul. 26, 2022

(54) REDUCER OF POWER STEERING APPARATUS FOR VEHICLE

(71) Applicant: MANDO CORPORATION, Gyeonggi-do (KR)

(72) Inventor: SeungWoo Cheon, Gyeonggi-do (KR)

(73) Assignee: MANDO CORPORATION, Gyeonggi-Do (KR)

(*) Notice: Subject to any disclaimer, the term of this patent is extended or adjusted under 35 U.S.C. 154(b) by 203 days.

(21) Appl. No.: 16/821,701

(22) Filed: Mar. 17, 2020

(65) Prior Publication Data
US 2021/0293319 A1    Sep. 23, 2021

(51) Int. Cl.
| F16H 55/22 | (2006.01) |
| F16H 55/06 | (2006.01) |
| B62D 5/04  | (2006.01) |
| B62D 3/04  | (2006.01) |

(52) U.S. Cl.
CPC ............ *F16H 55/22* (2013.01); *B62D 3/04* (2013.01); *B62D 5/0454* (2013.01); *F16H 55/06* (2013.01); *F16H 2055/065* (2013.01)

(58) Field of Classification Search
CPC .......... F16H 25/22; F16H 55/06; B62D 3/04; B62D 5/0454
See application file for complete search history.

(56) References Cited

U.S. PATENT DOCUMENTS

| 2002/0178853 | A1* | 12/2002 | Konishi ............... F16H 55/06 74/457 |
| 2009/0282939 | A1* | 11/2009 | Rogowski ............ F16H 55/06 74/424.5 |
| 2012/0067151 | A1* | 3/2012 | Kikuchi ............... F16H 55/22 74/425 |
| 2017/0166239 | A1* | 6/2017 | Kim ................. B62D 5/0403 |
| 2020/0325975 | A1* | 10/2020 | Ernstson ............. F16H 55/06 |
| 2021/0162639 | A1* | 6/2021 | Fujinaka ........... B29C 45/14336 |
| 2021/0293319 | A1* | 9/2021 | Cheon ............... B62D 5/0409 |

FOREIGN PATENT DOCUMENTS

| KR | 10-1193281 | 10/2012 |
| KR | 10-2017-0071648 | 6/2017 |
| WO | WO-2021145125 A1 * | 7/2021 ............ F16H 55/06 |

OTHER PUBLICATIONS

Office Action dated Apr. 12, 2019 for Korean Patent Application No. 10-2018-0023855 and its English translation by Google Translate.

* cited by examiner

*Primary Examiner* — Terence Boes
(74) *Attorney, Agent, or Firm* — Ladas & Parry, LLP

(57) ABSTRACT

A reducer of a power steering apparatus for vehicle. The formability and precision of a worm wheel is improved. The mechanical strength and durability of the worm wheel is increased so the reducer can be stably driven for a long time when a high power is transmitted from a worm shaft to a steering shaft through the worm wheel.

8 Claims, 9 Drawing Sheets

REDUCER OF POWER STEERING APPARATUS FOR VEHICLE

BACKGROUND

Field

Embodiments relate to a reducer of a steering apparatus for vehicle and, more particularly, to a reducer of a steering apparatus for vehicle by which formability and precision of the worm wheel are improved and mechanical strength and durability of the worm wheel are increased, thus the reducer can be stably driven for a long time when a high power is transmitted from the worm shaft to the steering shaft through the worm wheel.

Description of Related Art

Among the conventional power steering apparatuses mounted to a vehicle, there is an electric steering apparatus whose steering force is adjusted by a motor. The electric steering apparatus haves an electric control device which precisely controls the motor according to driving conditions of the vehicle detected by various sensors such as a vehicle speed sensor and a steering torque sensor, and torque generated from the motor is transmitted to the steering column or the pinion via a reducer, and the torque assists the driver in steering the steering wheel connected to the steering column and the pinion.

Accordingly, the power steering apparatus provides a steering state which is light and comfortable at low speed driving and is heavy and stable at high speed driving, and provides a steering performance which maintains an optimal steering condition for the driver such as to manage sudden emergency situations and enable quick steering operation.

The electric power steering apparatus can be classified into various types according to the position to which the reducer is mounted, wherein the reducer may be mounted to the steering column which fixes the steering shaft that connects the steering wheel of the driver seat with the gear box in the lower part of the vehicle, or to the gear box having the pinion coupled to the rack bar. Thus the rotational force of the steering wheel operated by the driver is assisted by the motor and the reducer, and transmitted to the rack bar.

However, since the worm shaft, the worm wheel, the steering shaft, etc., which rotate relatively are engaged with each other, vibration and noise generated by the rotation are directly transmitted to the driver, and decrease the durability or cause destruction of components of the reducer.

Particularly, in case the driver drives on an uneven road, an instantaneously increased load which is transmitted to the driver via the rack bar and the steering shaft from the wheel amplifies the vibration and the noise which is generated in the reducer, thereby causing discomfort to the driver.

BRIEF SUMMARY

Presents embodiments provide a reducer of steering apparatus for vehicle by which the formability and precision of the worm wheel are improved and the mechanical strength and durability of the worm wheel are increased, thus the reducer can be stably driven for a long time when a high power is transmitted from the worm shaft to the steering shaft through the worm wheel.

The object of the present embodiments is not limited to the aforementioned description, and other objects not explicitly disclosed herein will be clearly understood by those having ordinary knowledge in the technical field, to which the present embodiments pertains, from the description provided hereinafter.

According to the present embodiments, A reducer of a power steering apparatus for vehicle comprising a worm wheel and a worm coupled to a motor shaft which are engaged to provide steering assistance force to a steering shaft, wherein the worm wheel comprises, a gear part having a tooth portion which includes crests and roots to be engaged with the worm on the outer circumference of the worm wheel; an insert part provided inside the gear part having insert portions inserted into the crests; and wherein the insert portion comprises at least one of a lateral side protrusion provided on the both sides of the insert portion opposite in the circumferential direction, a lateral side depression provided on the both sides of the insert portion opposite in the circumferential direction, or an end protrusion provided on the end portion in the radial direction.

According to the embodiments, the formability and precision of the worm wheel may be improved and the mechanical strength and durability of the worm wheel may be increased, thus the reducer can be stably driven for a long time when a high power is transmitted from the worm shaft to the steering shaft through the worm wheel.

DESCRIPTION OF DRAWINGS

The above and other objects, features, and advantages of the present embodiments will be more clearly understood from the following detailed description, taken in conjunction with the accompanying drawings, in which.

DETAILED DESCRIPTION

Figure 1:
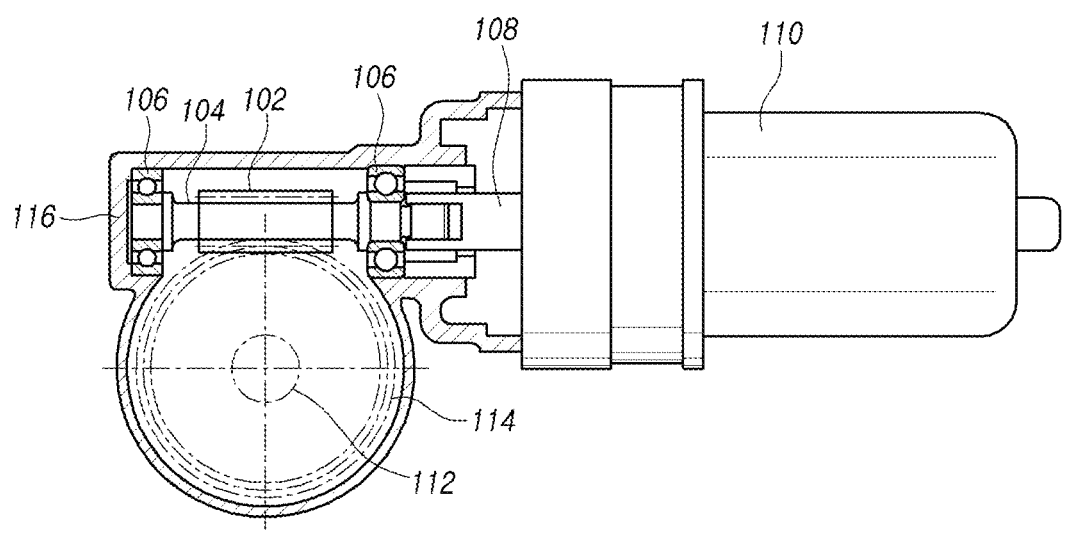
FIG. 1 is a schematic cross-sectional view of the internal structure of a reducer of a power steering apparatus according to the embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 2:
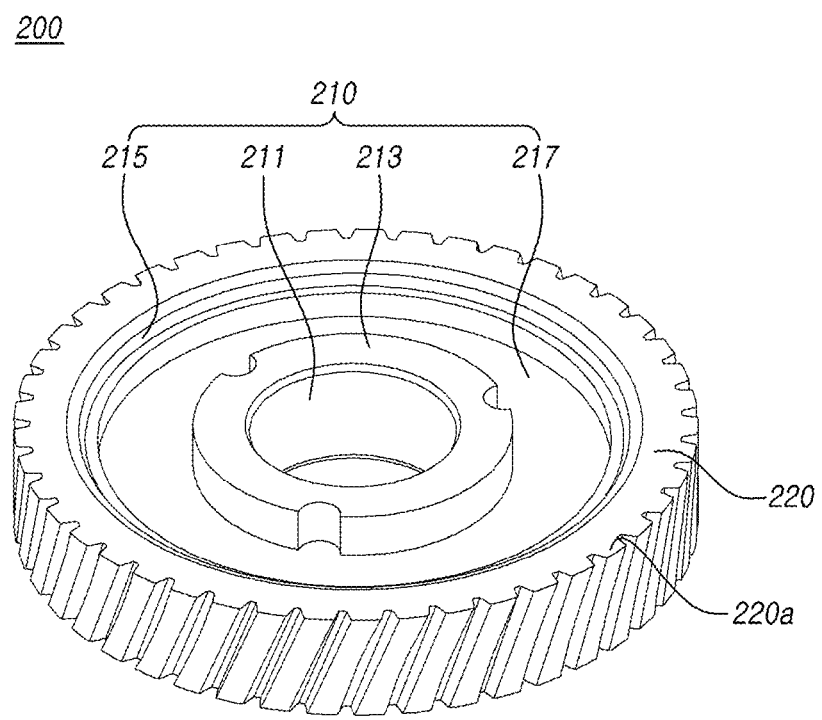
FIGS. 2 and 3 are perspective views illustrating portions of the reducer of the power steering apparatus according to the embodiments.
Figure 3:
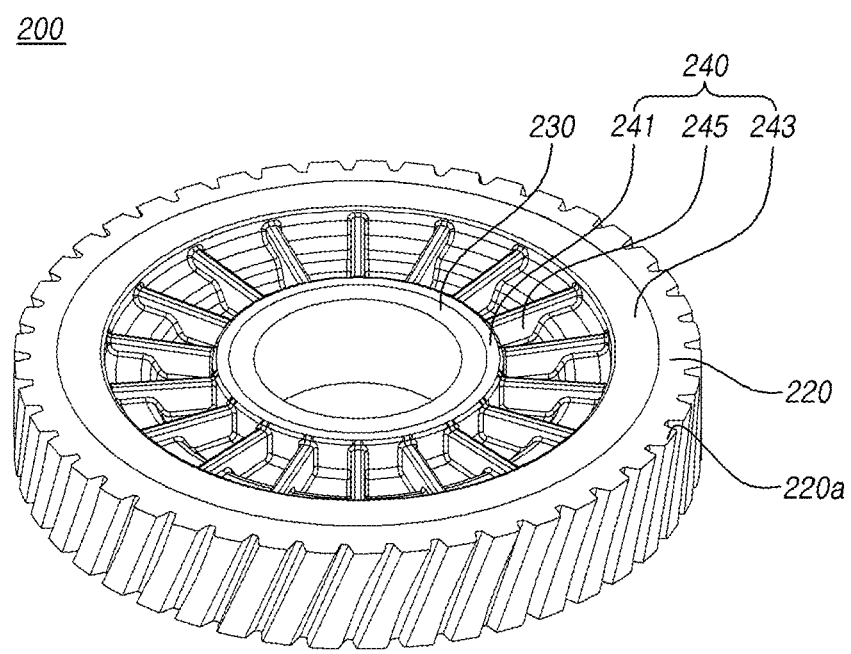

FIG. 1 is a schematic cross-sectional view of an internal structure of a reducer of a power steering apparatus according to the embodiments, FIGS. 2 and 3 are perspective views illustrating portions of the reducer of the power steering apparatus according to the embodiments, FIGS. 4 to 9 are cross-sectional views illustrating portions of the reducer of the power steering apparatus according to the embodiments.

Referring to FIG. 1, the reducer of the power steering apparatus has a worm shaft 104 made of metal such as steel and having a worm 102 formed in the intermediate portion. A worm bearing 106 is coupled to both ends of the worm shaft 104 to support the worm shaft 104, and the worm shaft 104 and a motor shaft 108 are connected to rotate the worm shaft 104 by a motor 110.

A worm wheel 114, which may be formed of resin composition, is provided at the outer surface of the worm 102 formed in the intermediate portion of the worm shaft 104 and engaged with the worm 102 so as to be driven as the reducer. The worm wheel 114 is mounted on a steering shaft 112 which transmits rotational force of a steering wheel (not shown) operated by a driver, so that the rotational force of the worm shaft 104 rotated by the motor 110 is transmitted to the steering shaft 112. The worm wheel 114 and the worm shaft 104, which are engaged in a worm gear manner, are mounted inside of a housing 116 to be protected from the outside.

According to driving conditions of a vehicle, an electronic controller (not shown) mounted to the vehicle controls the motor 110, and the rotational force of the worm shaft 104 rotated by the motor 110 is transmitted to the steering shaft 112 and added to the rotational force of the steering wheel operated by the driver, thus the steering operation of the driver can be smoothly and stably maintained.

The worm wheel 114 of the reducer acts to reduce the rotation of the motor 110 and transmits the rotation of the motor 110 to the steering shaft 112. The worm wheel 114 may be formed of resin composition as aforementioned.

The driving force of the motor 110 is transmitted by the worm shaft 104 and the worm wheel 114 of the reducer, and the driving force is decelerated or accelerated by the gear ratio of the worm shaft 104 and the worm wheel 114. The worm shaft 104 made of metal has the worm 102, and the worm wheel 114 is provided at the outer surface of the worm shaft 104 to be engaged with the worm 102 formed on the outer circumference of the worm shaft 104.

The reducer is mounted to the power steering apparatus, and the motor 116 drives the worm shaft 104 and the worm wheel 114 engaged with each other to rotate the steering shaft, thereby assisting the steering force of the driver. The worm bearing 106 is coupled to both ends of the worm shaft 104 to support worm shaft 104 rotated with the motor shaft 108 if the motor 110 is driven, the worm wheel 114 and the worm shaft 104 rotated with the steering shaft 112 are mounted inside of a housing 116.

Meanwhile, the steering shaft which transmits the rotational force of the steering wheel to the rack bar if the driver operates the steering wheel is connected with the column, the universal joint, the gear box comprising a rack gear and a pinion gear with the steering wheel. And, the reducer is coupled to the column or the portion of the steering shaft (or the pinion) embedded in the gear box.

Therefore, the worm wheel is rotated if the worm shaft is rotated by the motor, thus the steering force of the driver is assisted by the worm wheel coupled to the steering shaft of the column or the gear box.

Referring the FIGS. 2 and 3, the worm wheel 200 comprises a gear part 220 having a tooth portion 220a which includes crests and roots to be engaged with the worm on the outer circumference of the worm wheel 200, and insert parts 210,240 provided inside the gear part 220.

The insert parts 210,240 can be integrally formed with the gear part 220. The insert part 210, shown in FIG. 2, includes a small-diameter portion 213 in the center having a shaft connection hole 211 into which the steering shaft is inserted, and a large-diameter portion 215 on the outer circumferential side.

The insert part 210 is provided inside the gear part 220, and may be injection molded in a manner of such as single injection, double injection, triple injection or the like, integrally with the injection-molded gear part 220. The insert part 210 may further comprises a connection part 217 integrally formed to connect the small-diameter portion 213 and the large-diameter portion 215 radially, and the connection part 217 may be stepped axially with respect to the small-diameter portion 213 and the large-diameter portion 215.

The insert part 240, shown in FIG. 3, includes a herb 230 to which the steering shaft is coupled, an inner-cylinder portion 241 on the outer circumferential side of the herb 230, and an outer-cylinder portion 243 on the inner circumferential side of the gear part 220. In order that the inner-cylinder portion 241 and the outer-cylinder portion 243 can be connected by a plurality of ribs 245 formed radially, the inner-cylinder portion 241 and the outer-cylinder portion 243 may be injection-molded integrally in the mold or formed integrally with each other after molded individually.

As shown in FIGS. 2 and 3, the worm wheel can be formed in various shapes and structures of the insert parts 210,240 and the insert parts 201,240 can be integrally formed with the gear part 220 inside the gear part 220.

As shown in FIGS. 4 to 9, the insert parts 210,240 have insert portions 250 inserted into the crests, and the insert portions 250 comprises at least one of a lateral side protrusion 251 provided on the both sides of the insert portion 250 opposite in the circumferential direction, a lateral side depression 251' provided on the both sides of the insert portion 250 opposite in the circumferential direction, or an end protrusion 253 provided on the end portion in the radial direction.

Figure 4:
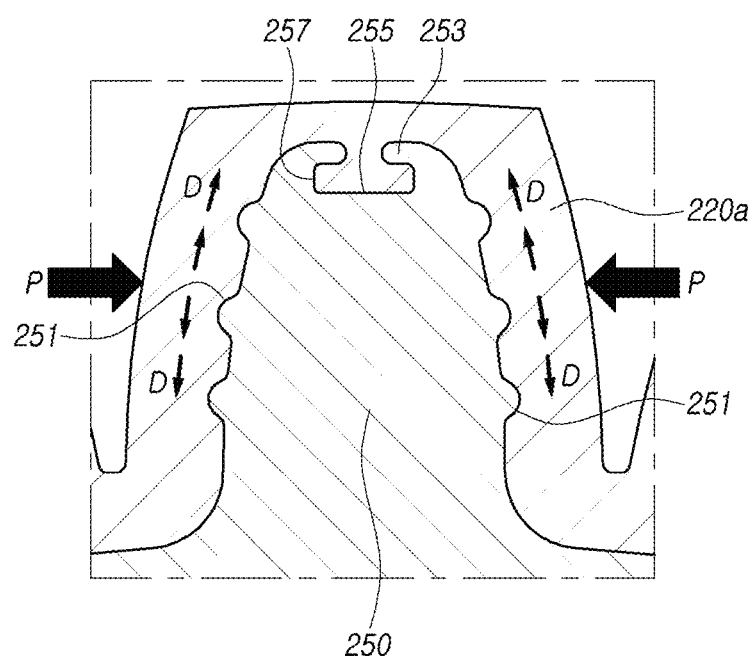
FIGS. 4 to 9 are cross-sectional views illustrating portions of the reducer of the power steering apparatus according to the embodiments.
Figure 5:
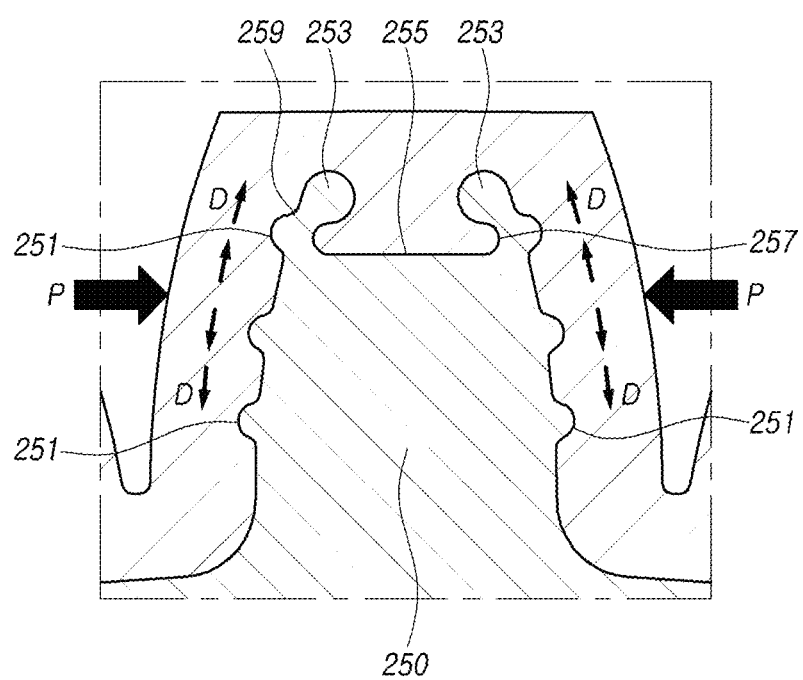

In addition, as shown in FIGS. 4 and 5, the insert parts 210,240 may have at least two of the lateral side protrusions 251 spaced apart radially from each other, thereby increasing the adhesion between the insert portion 250 and the tooth portion 220a even if the load (P) from the tooth portion 220a engaged with the worm causes the deformation force (D) transmitted radially inward and outward along the contact area between insert portion 250 and the tooth portion 220a, thereby increasing peel strength and durability of the worm wheel 200.

In addition, as shown in FIG. 4, the insert parts 210,240 may have a couple of the end protrusions 253 faced each other circumferentially, and the insert parts 210,240 may have an end depression 255 depressed radially between the end protrusions 253.

Accordingly, when the tooth portion 220a is molded, the resin melt is filled into the end depression 255 through the gap between the end protrusions 253, thereby developing firm coupling force with the insert portion 250, thereby maintaining the adhesion between the insert portion 250 and the tooth portion 220a even if the load (P) from the tooth portion 220a engaged with the worm causes the deformation force (D) transmitted radially inward and outward along the contact area between insert portion 250 and the tooth portion 220a.

In addition, the insert parts 210,240 may have extension portions 257 depressed circumferentially on the both sides of the inside the end depression 255.

Accordingly, the resin melt of the tooth portion 220a is filled into the extension portion 257 at the both sides of the end depression 255 with respect to the end protrusions 253, thereby maintaining the adhesion between the insert portion 250 and the tooth portion 220a nearby the end protrusions 253 if the deformation force (D) transmitted along the contact area between the insert portion 250 and the tooth portion 220a, thereby increasing the peel strength and the durability of the worm wheel 200.

In addition, as shown in FIG. 5, the end protrusion 253 may have a curved outer surface, and the curved outer surface is formed as convex outward to effectively support the deformation force (D) transmitted along the contact surface between the end protrusion 253 and the tooth portion 220a.

In addition, as shown in FIG. 5, the end protrusion 253 may be inclined radially inward, and the insert parts 210,240 may have a concave portion 259 formed as a concave curved surface between the end protrusion 253 and the lateral side protrusion 251.

Due to the concave portion 259, the deformation force transmitted along the contact area from the lateral side protrusion 251 can be supported effectively, thus the peel strength between the insert parts 210,240 and the tooth portion 220a is increased not only radially but also circumferentially, thereby satisfying the durability even if a high power is transmitted.

Figure 6:
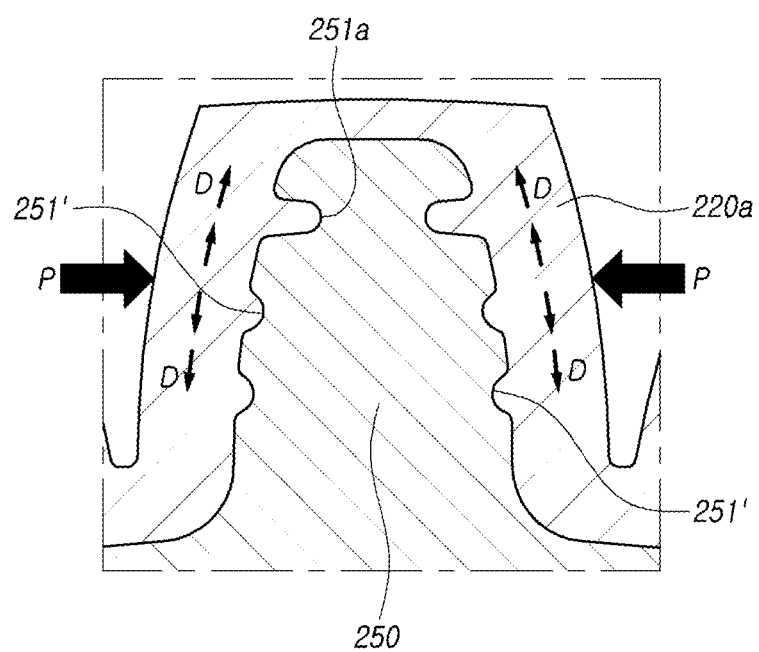
Figure 7:
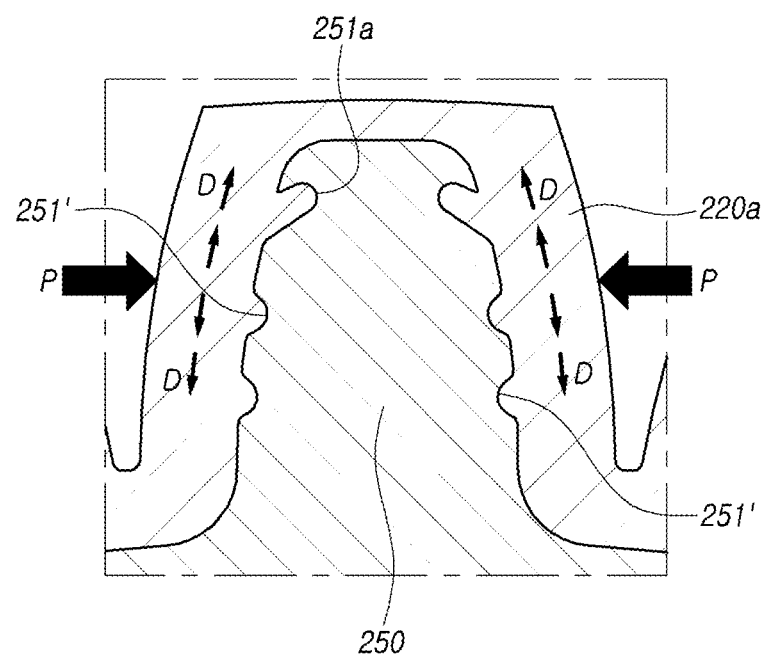

In addition, as shown in FIGS. 6 and 7, the insert part 210,240 may have at least two of the lateral side depression 251' spaced apart radially from each other, thereby increasing the adhesion between the insert portion 250 and the tooth portion 220a even if the load (P) from the tooth portion 220a engaged with the worm causes the deformation force (D) transmitted radially inward and outward along the contact area between insert portion 250 and the tooth portion 220a, thereby increasing the peel strength and the durability of the worm wheel 200.

The lateral side depression 251' at the radially outermost side among the lateral side depressions 251' may be further depressed, thereby increasing the peel strength and the durability between the insert portion 250 and the tooth portion 220a. Moreover, the lateral side depression 251' disposed at the radially outermost side among the lateral side depressions 251' is formed to be inclined radially inward, thereby increasing the adhesion between the insert portion 250 and the tooth portion 220a even if the deformation force (D) transmitted radially inward and outward is occurred.

Figure 8:
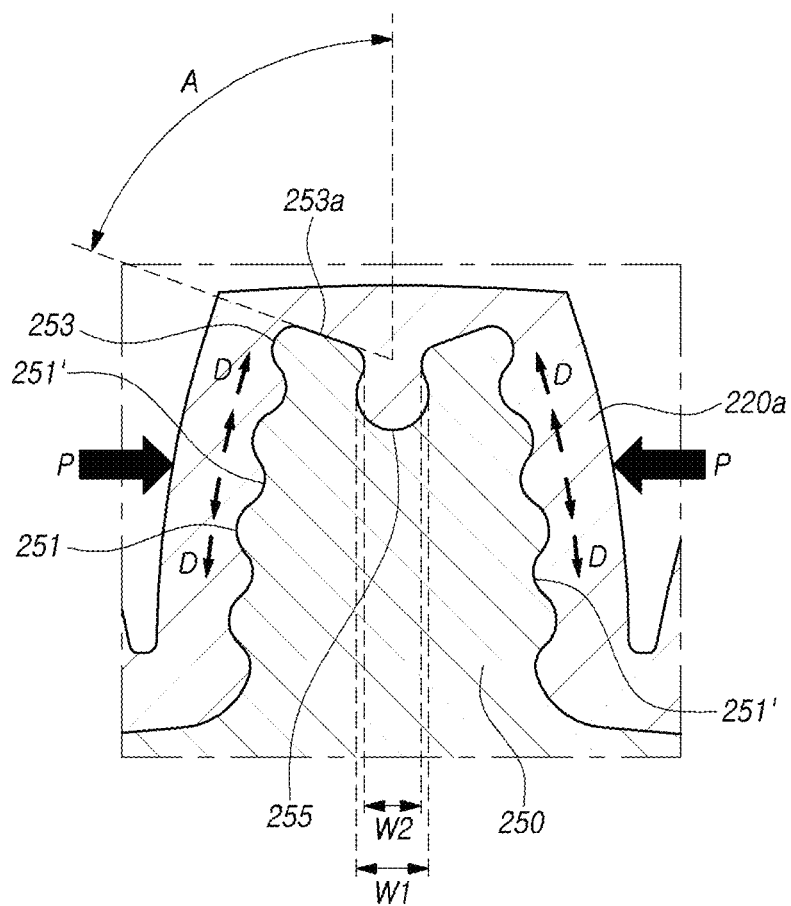

In addition, as shown in FIG. 8, the outer surface of the end protrusion 253 is inclined with respect the radial direction (vertical direction in the drawing).

That is, the radial outer surface 253a of the end protrusion 253 is inclined so as to increase the thickness of the tooth portion 220a toward the center between the end protrusions 253, wherein the radial direction is vertical direction of FIG. 8 and the circumferential direction is horizontal direction of FIG. 8. The radial outer surface of the end protrusions 253 may also be expressed as the radial outer surface of the insert portion 250.

Moreover, the angle (A) at which the outer surface of the end protrusion is inclined with respect to the radial direction is 60°~80°. If the angle (A) is less than 60° or more than 80°, the adhesion between the insert portion 250 and the tooth portion 220a is reduced if the deformation force (D) is transmitted radially inward and outward along the contact area between the insert portion 250 and the tooth portion 220a, thereby decreasing the peel strength and the durability of the worm wheel 220.

In addition, the insert parts 210,240 may have an end depression 255 depressed radially between the end protrusions 253.

Accordingly, when the tooth portion 220a is molded, the resin melt is filled into the end depression 255 through the gap between the end protrusions 253, thereby developing firm coupling force with the insert portion 250, thereby maintaining the adhesion between the insert portion 250 and the tooth portion 220a even if the load (P) from the tooth portion 220a engaged with the worm causes the deformation force (D) transmitted radially inward and outward along the contact area between the insert portion 250 and the tooth portion 220a.

The end depression 255 is opened between the end protrusions 255, and may be formed as circular or elliptical shape. Also, the circumferential width (W1) of the end depression 255 may be larger than the width (W2) between the end protrusions 253.

In other words, the width (W1) of the circumferentially widest portion of the end depression 255 is larger than the width (w2) of the most narrow portion between the end protrusions 253, thus the tooth portion 220a between the end protrusions 253 is prevented from being peeled off from the insert portion 250 if the load (P) is applied from the outer surface of the tooth portion 220a.

In addition, the outer surface 253a of the end protrusions 253 may be formed as a convex curved surface. Due to the convex outer surface 253a, the stream of the resin melt is not stagnant nearby the end protrusions 253 and the end depression 255, and flows with steady range of speed. Thus the tooth portion 220a may be molded with uniform strength, thereby increasing the adhesion between the insert portion 250 and the tooth portion 220a.

Figure 9:
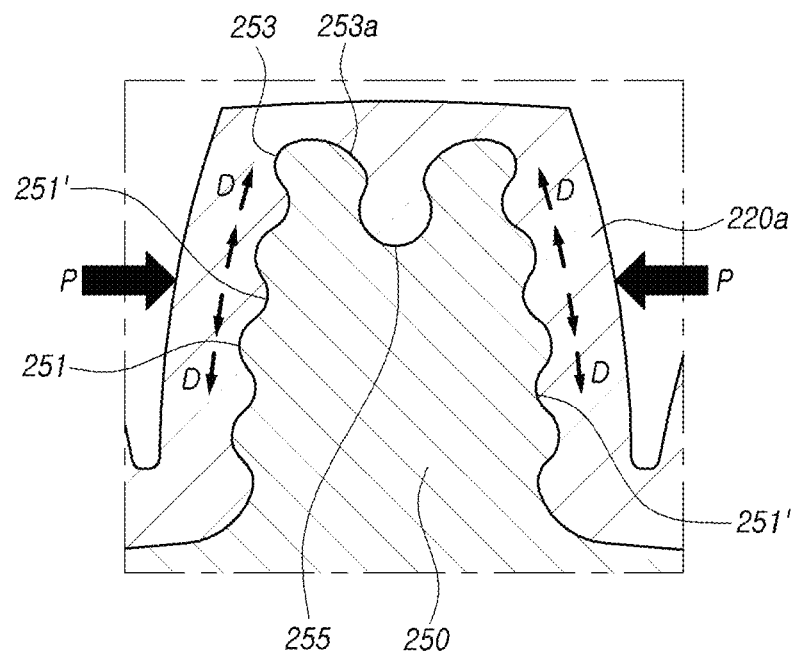

As shown in FIGS. 8 and 9, the lateral side protrusions 251 and the lateral side depressions 251' are alternately formed, thereby increasing the adhesion between the insert portion 250 and the tooth portion 220a if the deformation force (D) is transmitted radially inward and outward along the contact area between the insert portion 250 and the tooth portion 220a, thereby increasing the peel strength and the durability of the worm wheel 220.

In addition, the gear part 220 may be formed by mixing of one of polyamide 6, polyamide 66, polyamide 46 or polyamide 12 with 5~40 wt % of glass fiber, thereby improving hardness, tensile strength, flexural strength, high temperature physical properties, etc., and increasing durability.

Also, the insert parts 210,240 may be formed by mixing of one of polyamide 6, polyamide 66, polyamide 46 or polyamide 12 with 40~60 wt % of glass fiber, thereby improving hardness, tensile strength, flexural strength, high temperature physical properties, etc., and increasing durability, compared to the gear portion 220.

According to the embodiments relate to the power steering apparatus, the formability and precision of the worm wheel may be improved and the mechanical strength and durability of the worm wheel may be increased, thus the reducer can be stably driven for a long time when a high power is transmitted from the worm shaft to the steering shaft through the worm wheel.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A reducer of power steering apparatus for vehicle comprising a worm wheel and a worm coupled to a motor shaft which are engaged to provide a steering assistance force to a steering shaft,
   wherein the worm wheel comprises,
   a gear part having a tooth portion which includes crests and roots to be engaged with the worm on the outer circumference of the worm wheel;
   an insert part provided inside the gear part having insert portions inserted into the crests; and
   wherein the insert portion comprises a lateral side protrusion provided on the both sides of the insert portion opposite in the circumferential direction, and end protrusions protruding from an end portion of the insertion portion in a direction toward each other.

2. The reducer of power steering apparatus for vehicle according to claim 1, wherein the insert part and the gear part is integrally formed.

3. The reducer of power steering apparatus for vehicle according to claim 1, wherein the insert part has at least two of the lateral side protrusions spaced apart radially from each other.

4. The reducer of power steering apparatus for vehicle according to claim 1, wherein the insert part has a couple of the end protrusions faced each other circumferentially.

5. The reducer of power steering apparatus for vehicle according to claim 4, wherein the insert part has an end depression depressed radially between the end protrusions.

6. The reducer of power steering apparatus for vehicle according to claim 5, wherein the insert part has extension portions depressed circumferentially on an inside the end depression.

7. The reducer of power steering apparatus for vehicle according to claim 1, wherein the insert part has at least two of lateral side depressions spaced apart radially from each other, wherein the lateral side depressions are provided on the both sides of the insert portion opposite in the circumferential direction.

8. The reducer of power steering apparatus for vehicle according to claim 1, wherein the gear part is formed by mixing of one of polyamide 6, polyamide 66, polyamide 46 or polyamide 12 with 5~40 wt % of glass fiber, and the insert part is formed by mixing of one of polyamide 6, polyamide 66, polyamide 46 or polyamide 12 with 40~60 wt % of glass fiber.

* * * * *